United States Patent [19]

Gabbard et al.

[11] Patent Number: 5,232,956

[45] Date of Patent: Aug. 3, 1993

[54] FLEXIBLE WATER-BLOWN POLYURETHANE FOAMS

[75] Inventors: James D. Gabbard, Maryland Heights; A. Hameed Bhombal, Chesterfield, both of Mo.

[73] Assignee: Monsanto Company, St. Louis, Mo.

[21] Appl. No.: 740,368

[22] Filed: Aug. 5, 1991

[51] Int. Cl.$^5$ .............................................. C08J 9/12
[52] U.S. Cl. .................................... 521/107; 521/130
[58] Field of Search .............................. 521/107, 130

[56] References Cited

U.S. PATENT DOCUMENTS

| | | | |
|---|---|---|---|
| 3,772,222 | 11/1973 | Steward et al. | 260/2.5 |
| 4,169,922 | 10/1979 | Brown et al. | 521/155 |
| 4,196,268 | 4/1980 | Brown et al. | 521/130 |
| 4,262,093 | 4/1981 | Brown et al. | 521/107 |
| 4,275,171 | 6/1981 | Wegner | 521/107 |
| 4,287,307 | 9/1981 | Hostettler | 521/51 |
| 4,293,658 | 10/1981 | Raden et al. | 521/129 |
| 4,349,640 | 9/1982 | Keeney et al. | 524/294 |
| 4,363,882 | 12/1982 | Wegner | 521/108 |
| 4,433,089 | 2/1984 | Keeney et al. | 524/294 |
| 4,544,678 | 10/1985 | Fesman | 521/107 |
| 4,605,684 | 8/1986 | Pcolinsky, Jr. | 521/107 |
| 4,621,106 | 11/1986 | Fracalossi et al. | 521/99 |
| 4,812,356 | 3/1989 | Meyer et al. | 428/220 |
| 4,980,388 | 12/1990 | Harrington et al. | 521/130 |

FOREIGN PATENT DOCUMENTS

| | | |
|---|---|---|
| 932098 | 8/1973 | Canada. |
| 345678 | 12/1989 | European Pat. Off. . |
| 226034 | 12/1984 | Japan. |

*Primary Examiner*—Morton Foelak
*Attorney, Agent, or Firm*—Lawrence L. Limpus

[57] ABSTRACT

A flexible plasticized polyurethane foam is taught in which water is used as the foaming agent and a plasticizer selected from phthalate, phosphate ester adn bezoat plasticizers is added to improve the softness and flexibility of the polyurethane.

15 Claims, No Drawings

FLEXIBLE WATER-BLOWN POLYURETHANE FOAMS

This invention relates to the use of plasticizers in water-blown polyurethane foams to produce a flexible foam. More specifically, this invention relates to the use of phthalate plasticizers, phosphate ester plasticizers and benzoate plasticizers in water-blown polyurethane foams produced using p,p'-diphenylmethane diisocyanate (MDI).

BACKGROUND OF THE INVENTION

Polyurethane foams and methods for producing them are generally selected based upon the contemplated end use. Polyurethane foams produced from the reaction of polyols and toluene diisocyanate (TDI) are generally soft and flexible and they have thus been used when flexibility is required. In the past, greater than 80% of the toluene diisocyanate produced has been used to produce flexible foams. Polyurethane foams produced from the reaction of polyols and diphenylmethane diisocyanate are generally rigid and they have been used when strength and support have been required. In the past, 75% of the diphenylmethane diisocyanate produced has been used to produce rigid foams.

To produce a foam during the reaction of the polyol and the isocyanate, a foaming or blowing agent must be included in the reaction mixture. Fluorocarbon compounds, such as trichlorofluoromethane, have been used because they expand easily when heated and they do not react with the polyol and isocyanate. Fluorocarbon compounds continue to be used in the production of rigid foams; however, methylene chloride has displaced some of the fluorocarbon compounds in the production of flexible foams. Water is also used as a foaming agent. Water reacts with the isocyanate to form an unstable acid which decomposes into carbon dioxide that creates the desired foaming. However, the reaction of the water and isocyanate has an undesired affect upon the reaction of the isocyanate and polyols such that the polyurethane produced is more rigid, or harder, than it would be if the water were not present. This undesired hardening of the foam has limited the use of water as the foaming agent in the production of flexible polyurethane foams.

In Japanese patent application No. 59-226034, published Dec. 19, 1984, a method for manufacturing a foamed urethane molded article is described. A urethane foam is produced from the reaction of a polyol and an isocyanate compound using both a fluorocarbon compound and a small amount of water as the foaming agents. Both toluene diisocyanate (TDI) and p,p'-diphenylmethane diisocyanate (MDI) were used as the isocyanate compound. A phthalic acid plasticizer, such as the specifically discussed di-2-ethylhexyl phthalate (DOP), butyl benzyl phthalate (BBP), and dibutyl phthalate (DBP), was added to the reaction to reduce the lower mold temperature required for molding the desired articles. This Japanese application teaches the production of rigid foams, as shown by the sphere penetration test; and the plasticizers are added to reduce the required mold temperature.

BRIEF DESCRIPTION OF THE INVENTION

A soft, flexible, plasticized polyurethane foam composition is produced from the reaction of a polyol and p,p'-diphenylmethane diisocyanate by adding a plasticizer selected from the group of alkyl benzyl phthalates, benzoates and phosphate esters to the reaction compounds. A non-halogen containing foaming agent, preferably water or a gas such as carbon dioxide, is used to foam the polyurethane composition.

DETAILED DESCRIPTION OF THE INVENTION

In the past polyurethane foams produced from p,p'-diphenylmethane diisocyanate have been relatively stiff and rigid. Furthermore, the use of water as a foaming agent in the production of such polyurethane foams has also contributed to producing a stiffer, more rigid polyurethane foam. In order to produce softer foams, the concentration of water in the formulation has been decreased and inert physical blowing agents, such as trichlorofluoromethane or methylene chloride, have been included.

This invention has overcome these problems to produce a soft, flexible, plasticized polyurethane foam composition from the reaction of a polyol and p,p'-diphenylmethane diisocyanate by adding a plasticizer selected from the group of alkyl benzyl phthalate plasticizers, phosphate ester plasticizers and benzoate plasticizers to the reaction compounds. A non-halogen containing foaming agent, preferably water or a non-halogen containing gas such as carbon dioxide, is used to foam the polyurethane compound.

P,P'-diphenylmethane diisocyanate is a basic raw material in the production of polyurethane foams as well as elastomers and fibers. It is marketed in a pure crystalline form and in a liquid modified "pure" grade, but mainly as "polymeric" or "crude" diphenylmethane diisocyanate, a mixture of diisocyanate and higher oligomers, principally triisocyanate. These products are obtained by the reaction of phosgene with aniline-formaldehyde condensation products. The diphenylmethane diisocyanate is manufactured by the phosgenation of amines derived from the condensation of aniline and formaldehyde. By changing the aniline-formaldehyde ratio and the reaction conditions, products of varying molecular weight distribution (and average functionality) can be obtained. Changes in these parameters also affect the amount of various isomers that are obtained. After phosgenation of the mixture of amines, part of the pure p,p'-diphenylmethane diisocyanate is removed by distillation. After removal of the pure p,p'-diphenylmethane diisocyanate by distillation a dark liquid material is left. This liquid, called polymeric diphenylmethane diisocyanate, is a mixture of diisocyanates and higher oligomers. Most of the diphenylmethane diisocyanate found in polyurethanes is the polymeric type (85% of the total), but pure diphenylmethane diisocyanate also enjoys a significant market. While p,p'-diphenylmethane diisocyanate is specifically discussed herein, it is equally possible to produce the desired polyurethane using other isomers of the diphenylmethane diisocyanate.

The other basic raw material for the production of polyurethane foams is the polyol that will react with the isocyanate. This polyol may be a polyether polyol, a polyester polyol, or a polyol chain extender.

Polyether polyols are most commonly used in the production of polyurethane foams. Representative examples of polyether polyols are polyether diols such as polypropylene glycol, polyethylene glycol and polytetramethylene glycol; polyether triols such as glycerol triols; polyether tetrols and pentols such as aliphatic amine tetrols and aromatic amine tetrols; polyether octols such as sucrose octol; and others such as sorbitol, trimethylol propane, and pentaerythritol.

Polyurethane foams are the largest single outlet for polyester polyols. Representative examples of polyester polyols used to make polyurethane foams are ethylene and diethylene glycol adipates, butanediol adipate, polytetramethylene glycol adipate, Hexanediol adipate, and the polyols produced by the products from dimethyl terephthalate production reacted with diols and triols.

Polyol chain extenders are used to react to increase the length of the carbon chains in the polyurethane foam compositions. The polyol chain extenders may be monomeric short chain diols or triols such as 1,4-butanediol, ethylene glycol and hydroquinone di(ethylether) or primary diamines such as ethylene diamine, hydrazine, 3,5-diethyl toluenediamine (DETDA) and methylene bisorthochloraniline (MOCA).

In addition to the isocyanate and the polyol, the production of polyurethane foam requires the presence of a foaming or blowing agent. Fluorocarbon blowing agents such as trichlorofluoromethane have been used to produce foams; however, the future of the fluorocarbon blowing agents depends upon government regulations. The heat of reaction, and sometime externally applied heat, causes expansion of the fluorocarbon compound when it is used as the foaming agent. Methylene chloride has displaced some of the fluorocarbon compounds in the production of flexible foams. However, it is becoming more desireable to remove all halogen compounds from the process. Therefore, non-halogen containing gases such as carbon dioxide may be used. A common foaming agent, and the preferred agent for the process of this invention is water. Water added to the reaction of the isocyanate and polyol reacts with the isocyanate to form an unstable carbamic acid which decomposes to the corresponding amine and carbon dioxide. The amine reacts with another isocyanate group to form a symmetrical disubstituted urea. Either hydrogen of the disubstituted urea may react further with another isocyanate to form a biuret which provides additional polymer branching or crosslinking. The reaction of the isocyanate and the polyol is exothermic. When, as preferred in this invention, water is provided as the foaming agent, the water/isocyanate reaction generates carbon dioxide which expands to provide the expansion or foaming of the polyurethane being produced. One of the main problems involved in replacing the ozone-depleting fluorocarbon compound as blowing agent in flexible polyurethane foams with water is the increased firmness of the resulting foams. This is due to the rigid urea groups introduced as a result of the water-isocyanate reaction. With diphenylmethane diisocyanate based flexible foams, this problem is compounded because their utilization to replace toluene diisocyanate results in higher hard segment content due to the higher equivalent weight of diphenyl methane diisocyanate over toluene diisocyanate. One method as found in this invention, to obtain softer water-blown foams is to use plasticizers.

Other materials are commonly added to the polyurethane during production to reduce problems during production or to provide desired properties in the polyurethane product. Among the additives are catalysts such as amines and metal salts, cell regulators or surfactants such as silicones to aid thorough mixing of the ingredients and to regulate cell growth, fire retardants when they are needed, and stabilizers and antioxidants such as hindered amine light stabilizers and benzotriazoles.

The use of water as the foaming agent in flexible polyurethane foams increases the firmness of the resulting foams. This invention has found that plasticizers may be added to produce a softer, more flexible polyurethane foam which, more importantly, displayed good load bearing properties without significant loss of the other required strength properties.

The effect of varying levels of plasticizers (from 5 to 20 parts by weight based upon the weight of the polyol) on the properties of diphenylmethane diisocyanate (MDI) based water-blown polyurethane foams is shown in the following tables. In the Examples shown below, the plasticizer is added to the composition in the amounts of 5, 10 and 20 parts by weight. While this range is the most preferred, it is recognized that less plasticizer, such as amounts less than 1 part by weight, may be added and that this reduced amount of plasticizer will provide softening effect upon the composition.

It is also recognized that greater amounts of plasticizer may be desired in the composition and that 100 parts by weight of plasticizer per 100 parts by weight of polyol may be used and that a particular product may require as much as 150 parts by weight of plasticizer per 100 parts by weight of polyol. Plasticizers in this invention are phthalate plasticizers such as, for example, alkyl aryl phthalates including butyl benzyl phthalate, alkyl benayl phthalates wherein the alkyl group has a carbon chain having from seven to nine carbon atoms, texanol benzyl phthalate, alkyl phenyl phthalate, symetrical and unsymetrical dialkyl phthalates including diisononyl phthalate, diisodecyl phthalate, dioctyl phthalate, dihexyl phthalate, diheptyl phthalate, butyloctyl phthalate, linear dialkyl phthalate, wherein the alkyl groups are independently carbon chains having from seven to eleven carbon atoms, and butyl cyclohexyl phthalate; and phosphate ester plasticizers such as, for example, 2-ethylhexyl diphenyl phosphate, isodecyl diphenyl phosphate mixed dodecyl and tetradecyl diphenyl phospate, trioctyl phosphate, tributyl phosphate, butylphenyl diphenyl phosphate and isopropylated triphenyl phosphate; and benzoate plasticizers such as, for example, texanol benzoate, glycol benzoate, propylene glycol dibenzoate, dipropylene glycol dibenzoate and propylene glycol dibenzoate. For comparison, the effect of different general plasticizers (dibutyl phthalate, and dioctyl phthalate) on the properties of the water-blown diphenylmethane diisocyanate-based flexible foams is also shown.

Free rise foams were prepared at varying densities. The foam strength and load bearing properties, as well as the energy absorbing abilities were studied. The flame retardant effect of the plasticizers was also evaluated.

EXAMPLES

A. Chemicals

The chemicals employed in the preparation of foams are listed in Table 1. All chemicals were used as obtained from suppliers.

B. Preparation and Testing

The foams were prepared at ambient temperature, by the one-shot method, using a high speed laboratory stirrer. The foaming process was followed by measuring the cream, rise, and tack free times. Prior to testing the foams were allowed to age for seven days at room conditions.

The maximum temperature reached during the foaming reaction was measured by placing a thermocouple in the foaming mixture, immediately after mixing all components and before cream time.

The following tests were performed using ASTM D 3574-86:
Density
Tensile strength
Elongation
Tear strength
Compression Force Deflection (CFD)
Compression set
Rebound The following additional tests were also performed:
The indentation force deflection (IFD) was measured according to ASTM D 3453-80.
The burning properties of the foams were measured according to California Test 117.

C. Formulations

The basic formulations selected for this study for the p,p'-diphenylmethane diisocyanate-based water blown flexible foams are shown in Table 3, in column No. 1 and in Table 7, in column No. 1. Both formulations were based on polyether polyol (Pluracol 380 and a mixture of Pluracol 380 with PPG-2000). Two diphenylmethane diisocyanate (MDI) formulations were utilized, ISO 80 which was used in the formulations shown in Tables 3-6 and Rubinate MF-182 which was used in the formulations shown in Tables 7 and 8. The foams were prepared at varying levels of plasticizers (5, 10 and 20 parts by weight). In the tables, the formulation component amounts are expressed in parts by weight (pbw) compared to the weight of the polyol in the composition.

D. Miscibility

The plasticizers exhibited excellent compatibility with the polyol Pluracol 380 and resulted in a significant decrease in viscosity (Table 2) at the ratio of 100 parts by weight (pbw) of Pluracol 380 to 25 parts by weight (pbw) of plasticizers.

E. Density

The foam density increased slightly in the presence of plasticizers in the formulations based on polyisocyanate ISO 80. This is as expected since the quantity of the blowing agent remained the same. In the foam formulations based on Rubinate MF-182 (Table 7) with 10 parts by weight (pbw) of plasticizers, the density surprisingly slightly decreased with the addition of the plasticizers of this invention as well as with the general commercial plasticizers DOP, DBP. It is thought that the very good compatibility of the plasticizers with the foam polymer matrix enhanced formation of a finer cell structure and thus increased the blowing efficiencies. This is supported by the effectiveness in decreasing the foam compressive force deflection (Tables 7 and 8). With 20 parts by weight of plasticizers (Table 8) the density slightly increased (4%) as a result of the significant weight increase (12%).

F. Stress-Strain Properties

In the foam formulations based on ISO 80 (Tables 3 and 4) with 5 and 10 parts by weight (pbw) of plasticizers, there was observed minimal losses of tensile strength compared to the foam without plasticizer. At 20 parts by weight (pbw) of plasticizers the tensile strength decreased significantly, as expected. The elongation didn't undergo uniform changes which can be ascribed to many factors such as cell size and foam morphology.

The presence of plasticizers in water-blown foams based on Rubinate MF-182 (Tables 7 and 8) increased the foam strength, in most cases. Tear strength (Tables 3-5 and 7-8) decreased somewhat with the increase of plasticizer level as expected.

G. Firmness and Load Bearing Properties

The plasticizers of this invention were found to be very effective in decreasing the firmness of diphenylmethane diisocyanate-based water blown foams, as measured by compression force deflection (CFD) Tables 3-5, 7-9). Even with 5 parts by weight (pbw) of plasticizers a decrease of CFD values resulted. This effect was increased with increasing plasticizer level, as shown for example, for the Texanol benzyl phthalate plasticizer. With butyl benzyl phthalate plasticizer, (Table 8) CFD at 65% deflection decreased to 0.55 psi/pcf (0.24 kPaf (Kg/cm$^3$)) compared to 1.45 psi/pcf (0.62 KPa/(Kg/cm$^3$)) for the foam without plasticizer. A significant difference between the plasticizers resulted.

Most importantly the IFD (indention force deflection) sag factor didn't decrease with the presence of plasticizers (Tables 7-8), even though softer foams were obtained. For the foams the sag factor was found to be higher than 2, which can be considered as good load bearing for cushioning applications.

H. Compression Set

The compression set was measured after dry and humid aging. The compression set was low in the expected range for high resilient foam (less than 20%) (Tables 4, 5). The compression set significantly improved with the presence of plasticizers. This can be ascribed to the bulky, hydrophobic structure of the plasticizers.

I. Energy Absorbing Properties

It was found that plasticizers enhanced, in most cases, the energy absorbing abilities of the foams as measured by ball rebound and hysteresis loss (Tables 3 and 4).

J. Flammability

The plasticizers of this invention resulted in reduced flammability of the water blown flexible foams (Table 7). The burning time shortened from 500 seconds for the reference system to 192 seconds for the foam containing 20 parts by weight (pbw) of isodecyl diphenyl phosphate plasticizer.

TABLE 1

| Materials and Suppliers | | |
|---|---|---|
| Designation | Description | Suppliers |
| Pluracole@ 380 | Polyether polyol, eq. wt. = 2244 | BASF Corp. |

TABLE 1-continued

Materials and Suppliers

| Designation | Description | Suppliers |
|---|---|---|
| PPG-2000 | Polyoxypropylene glycol, eq. wt. = 1005 | BASF Corp. |
| DEOA | Diethanolamine | Aldrich Chemical Co. |
| DABCO@ 33LV | 33% Triethylene diamine 67% dipropylene glycol | Air Prod. & Chemicals, Inc. |
| Niax A-1 | Bis (dimethylaminoethyl) ether in dripropylene glycol, 70% | Union Carbide Corp. |
| Niax@ C-174 | Tertiary amine/ethanol | Union Carbide Corp. |
| T-12 | Tin-Catalyst | Air Prod. & Chemicals, Inc. |
| DC-5043 | Silicone surfactant | Dow Corning Corp. |
| DC-5169 | Silicone surfactant | Dow Corning Corp. |
| Freon 11@ | Trichlorofluromethane | E. I. duPont de Nemours Co. |
| ISO 80 | Isocyanate No. 80 Polymeric MDI, eq. wt. - 168 | BASF Corp. |
| Rubinate MF-182 | Polymeric MDI, eq. wt. = 132 | ICI |
| Santicizer 141 | 2-Ethylhexyl diphenyl phosphate | Monsanto Company |
| Santicizer 148 | Isodecyl diphenyl phosphate | Monsanto Company |
| Santicizer 160 | Butyl benzyl phthalate | Monsanto Company |
| Santicizer 278 | Texanolbenzyl phthalate | Monsanto Company |
| Santicizer 261 | 7-9-Alkyl benzyl phthalate | Monsanto Company |
| DBP | Di-n-butyl phthalate | Aristech Chemical Corp. |
| DOP | Dioctyl phthalate | Aristech Chemical Corp. |

TABLE 2

The Viscosity and Miscibility of Pluracol 380 With Various Plasticizers.

| Poly, pbw | Plasticizer, pbw | Miscibility | Viscosity, cP |
|---|---|---|---|
| Pluracol 380 | — | — | 2375 |
| Pluracol 380 100 | Santicizer 141 25 | Miscible | 1300 |
| Pluracol 380 100 | Santicizer 148 25 | Miscible | 1350 |
| Pluracol 380 100 | Santicizer 160 25 | Miscible | 1670 |
| Pluracol 380 100 | Santicizer 261 25 | Miscible | 1600 |
| Pluracol 380 100 | Santicizer 278 25 | Miscible | 2040 |

TABLE 3

The effect of Plasticizers (5 pbw) on the Properties of Water Blown MDI-Based Flexible Foams.

| Designation | 1 | 2 | 3 | 4 | 5 | 6 |
|---|---|---|---|---|---|---|
| Formulation (pbw) | | | | | | |
| Pluracol 380 | 100 | 100 | 100 | 100 | 100 | 100 |
| Water | 3.7 | 3.7 | 3.7 | 3.7 | 3.7 | 3.7 |
| DEOA | 0.24 | 0.24 | 0.24 | 0.24 | 0.24 | 0.24 |
| Dabco 33LV | 0.30 | 0.30 | 0.30 | 0.30 | 0.30 | 0.30 |
| Niax C-174 | 0.60 | 0.60 | 0.60 | 0.60 | 0.60 | 0.60 |
| DC-5043 | 1.0 | 1.0 | 1.0 | 1.0 | 1.0 | 1.0 |
| T-12 | 0.18 | 0.18 | 0.18 | 0.18 | 0.18 | 0.18 |
| Plasticizer | | | | | | |
| Santicizer 141 | — | 5 | — | — | — | — |
| Santicizer 148 | — | — | 5 | — | — | — |
| Santicizer 160 | — | — | — | 5 | — | — |
| Santicizer 261 | — | — | — | — | 5 | — |
| Santicizer 278 | — | — | — | — | — | 5 |
| ISO 80 | 81.4 | 81.4 | 81.4 | 81.4 | 81.4 | 81.4 |
| Isocyanate Index | 105 | 105 | 105 | 105 | 105 | 105 |
| Properties | | | | | | |
| Density (Kg/cm$^3$) | 43.25 | 46.45 | 44.85 | 44.85 | 44.85 | 44.85 |
| Tensile Strength (KPa) | 142.6 | 164.0 | 161.2 | 124.7 | 141.5 | 136.4 |
| Elongation (%) | 193 | 195 | 199 | 202 | 191 | 200 |
| Tear Strength (Kg/cm) | .39 | .41 | .41 | .39 | .48 | .41 |
| CFD (5 × 5 × 2.5 cm) | | | | | | |
| 25% (KPa) | 8.47 | 9.92 | 9.85 | 7.65 | 9.09 | 9.16 |
| 50% (KPa) | 13.36 | 14.05 | 12.95 | 10.40 | 13.44 | 12.47 |
| 65% (KPa) | 21.08 | 21.43 | 18.05 | 15.16 | 21.85 | 18.19 |
| Normalized CFD (5 × 5 × 2.5 cm) | | | | | | |
| 25% (KPa/Kg/cm$^3$) | .19 | .22 | .22 | .17 | .20 | .20 |
| 50% (KPa/Kg/cm$^3$) | .31 | .30 | .29 | .23 | .30 | .28 |
| 65% (KPa/Kg/cm$^3$) | .49 | .46 | .40 | .34 | .49 | .40 |
| Resilience (ball, %) | 46 | 47 | 40 | 40 | 41 | 41 |
| Hysteresis (%) | 54.0 | 55.6 | 55.6 | 55.4 | 55.3 | 55.9 |
| Compression set, Dry aged (%) | 17.1 | 19.9 | 19.1 | 20.4 | 19.5 | 17.7 |

TABLE 4

The effect of Plasticizers (10 pbw) on the Properties of Water Blown MDI-Based Flexible Foams.

| Designation | 1 | 2 | 3 | 4 | 5 | 6 |
|---|---|---|---|---|---|---|
| Formulation (pbw) | | | | | | |
| Pluracol 380 | 100 | 100 | 100 | 100 | 100 | 100 |
| Water | 3.7 | 3.7 | 3.7 | 3.7 | 3.7 | 3.7 |
| DEOA | 0.24 | 0.24 | 0.24 | 0.24 | 0.24 | 0.24 |
| Dabco 33LV | 0.30 | 0.30 | 0.30 | 0.30 | 0.30 | 0.30 |
| Niax C-174 | 0.60 | 0.60 | 0.60 | 0.60 | 0.60 | 0.60 |
| DC-5043 | 1.0 | 1.0 | 1.0 | 1.0 | 1.0 | 1.0 |
| T-12 | 0.18 | 0.18 | 0.18 | 0.18 | 0.18 | 0.18 |
| Plasticizer | | | | | | |
| Santicizer 141 | — | 10 | — | — | — | — |
| Santicizer 148 | — | — | 10 | — | — | — |
| Santicizer 160 | — | — | — | 10 | — | — |
| Santicizer 261 | — | — | — | — | 10 | — |
| Santicizer 278 | — | — | — | — | — | 10 |
| ISO 80 | 81.4 | 81.4 | 81.4 | 81.4 | 81.4 | 81.4 |
| Isocyanate Index | 105 | 105 | 105 | 105 | 105 | 105 |
| Properties | | | | | | |
| Density (Kg/cm$^3$) | 43.25 | 48.05 | 41.65 | 44.85 | 44.85 | 44.85 |
| Tensile Strength (KPa) | 142.6 | 138.5 | 124.7 | 123.4 | 101.9 | 145.4 |
| Elongation (%) | 193 | 205 | 216 | 139 | 181 | 222 |
| Tear Strength (Kg/cm) | .39 | .34 | .37 | .36 | .37 | .41 |
| CFD (5 × 5 × 2.5 cm) | | | | | | |
| 25% (KPa) | 8.47 | 8.61 | 7.99 | 9.30 | 9.16 | 10.33 |
| 50% (KPa) | 13.37 | 11.71 | 9.99 | 12.06 | 11.50 | 12.95 |
| 65% (KPa) | 21.08 | 19.29 | 12.88 | 16.12 | 14.81 | 16.81 |
| Normalized CFD (5 × 5 × 2.5 cm) | | | | | | |
| 25% (KPa/Kg/cm$^3$) | .19 | .18 | .19 | .21 | .21 | .23 |

TABLE 4-continued

The effect of Plasticizers (10 pbw) on the Properties of Water Blown MDI-Based Flexible Foams.

| Designation | 1 | 2 | 3 | 4 | 5 | 6 |
|---|---|---|---|---|---|---|
| 50% (KPa/Kg/cm³) | .31 | .25 | .25 | .27 | .26 | .29 |
| 65% (KPa/Kg/cm³) | .49 | .36 | .31 | .36 | .31 | .37 |
| Resilience (ball, %) | 46 | 42 | 40 | 43 | 40 | 42 |
| Hysteresis (%) | 54.0 | 53.2 | 57.6 | 54.0 | 52.8 | 56.5 |
| Compression set, Dry aged (%) | 17.1 | 14.7 | 16.7 | 14.4 | 11.1 | 14.9 |
| Compression set, Humid aged (%) | 19.2 | 16.7 | — | 18.2 | 11.3 | 16.8 |

TABLE 5

The effect of Plasticizers (20 pbw) on the Properties of Water Blown MDI-Based Flexible Foams.

| Designation | 1 | 2 | 3 | 4 | 5 |
|---|---|---|---|---|---|
| Formulation (pbw) | | | | | |
| Pluracol 380 | 100 | 100 | 100 | 100 | 100 |
| Water | 3.7 | 3.7 | 3.7 | 3.7 | 3.7 |
| DEOA | 0.24 | 0.24 | 0.24 | 0.24 | 0.24 |
| Dabco 33LV | 0.30 | 0.30 | 0.30 | 0.30 | 0.30 |
| Niax C-174 | 0.60 | 0.60 | 0.60 | 0.60 | 0.60 |
| DC-5043 | 1.0 | 1.0 | 1.0 | 1.0 | 1.0 |
| T-12 | 0.18 | 0.18 | 0.18 | 0.18 | 0.18 |
| Plasticizer | | | | | |
| Santicizer 141 | — | 20 | — | — | — |
| Santicizer 160 | — | — | 20 | — | — |
| Santicizer 261 | — | — | — | 20 | — |
| Santicizer 278 | — | — | — | — | 20 |
| ISO 80 | 81.4 | 81.4 | 81.4 | 81.4 | 81.4 |
| Isocyanate Index | 105 | 105 | 105 | 105 | 105 |
| Properties | | | | | |
| Density (Kg/cm³) | 43.25 | 48.05 | 48.05 | 46.45 | 44.85 |
| Tensile Strength (KPa) | 142.6 | 88.6 | 100.6 | — | 99.2 |
| Elongation (%) | 193 | 152 | 168 | — | 196 |
| Tear Strength (Kg/cm) | .39 | .32 | .34 | — | .32 |
| CFD (5 × 5 × 2.5 cm) | | | | | |
| 25% (KPa) | 8.47 | 8.40 | 9.99 | 9.65 | 7.17 |
| 50% (KPa) | 13.37 | 10.88 | 12.20 | 12.05 | 9.09 |
| 65% (KPa) | 21.08 | 14.88 | 14.88 | 15.36 | 11.02 |
| Normalized CFD (5 × 5 × 2.5 cm) | | | | | |
| 25% (KPa/Kg/cm³) | .19 | .17 | .21 | .21 | .30 |
| 50% (KPa/Kg/cm³) | .31 | .22 | .25 | .26 | .20 |
| 65% (KPa/Kg/cm³) | .49 | .31 | .31 | .33 | .26 |
| Resilience (ball, %) | 46 | 41 | 38 | 43 | 41 |
| Hysteresis (%) | 54.0 | 51.8 | 53.3 | 51.1 | 53.1 |
| Compression set, Dry aged (%) | 17.1 | 6.5 | 8.2 | 9.9 | 11.8 |
| Compression set, Humid aged (%) | 19.2 | 9.9 | — | 11.3 | — |

TABLE 6

Formulation and Properties of MDI-Based Flexible Foam Blown with a Mixture of Water and Freon-11 (50/50).

| Formulation (pbw) | |
|---|---|
| Pluracol 380 | 100 |
| Water | 3.7 |
| DEOA | 0.24 |
| Dabco 33LV | 0.30 |
| Niax C-174 | 0.60 |
| DC-5043 | 1.0 |
| T-12 | 0.18 |
| Freon-11 | 12 |
| ISO 80 | 81.4 |
| Isocyanate index | 105 |
| Properties | |
| Density (Kg/CM³) | 33.16 |
| Tensile strength (KPa) | 90.3 |
| Elongation (%) | 193 |
| Tear strength (Kg/cm) | .41 |
| CFD (5 × 5 × 2.5 cm) | |
| 25% (KPa) | 5.24 |
| 50% (KPa) | 7.23 |
| 65% (KPa) | 10.47 |
| Normalized CFD (5 × 5 × 2.5 cm) | |
| 25% [KPa/(Kg/cm³)] | 0.16 |
| 50% [KPa/(Kg/cm³)] | 0.22 |
| 65% [KPa/(Kg/cm³)] | 0.31 |
| Resilience (ball, %) | 35 |
| Hysteresis (%) | 57.3 |
| Compression set, Humid aged (%) | 21.7 |

TABLE 7

The effect of Plasticizers (10 pbw) on the Properties of Water Blown MDI-Based Flexible Foams.

| Designation | 1 | 2 | 3 | 4 | 5 | 6 | 7 | 8 |
|---|---|---|---|---|---|---|---|---|
| Formulation (pbw) | | | | | | | | |
| Pluracol 380 | 70 | 70 | 70 | 70 | 70 | 70 | 70 | 70 |
| Thanol PPG 2000 | 30 | 30 | 30 | 30 | 30 | 30 | 30 | 30 |
| Water | 3.7 | 3.7 | 3.7 | 3.7 | 3.7 | 3.7 | 3.7 | 3.7 |
| DEOA | 0.24 | 0.24 | 0.24 | 0.24 | 0.24 | 0.24 | 0.24 | 0.24 |
| Dabco 33LV | 0.60 | 0.60 | 0.60 | 0.60 | 0.60 | 0.60 | 0.60 | 0.60 |
| Niax A-1 | 0.16 | 0.16 | 0.16 | 0.16 | 0.16 | 0.16 | 0.16 | 0.16 |
| DC-5169 | 0.80 | 0.80 | 0.80 | 0.80 | 0.80 | 0.80 | 0.80 | 0.80 |
| Plasticizer | | | | | | | | |
| Santicizer 141 | — | 10 | — | — | — | — | — | — |
| Santicizer 148 | — | — | 10 | — | — | — | — | — |
| Santicizer 160 | — | — | — | 10 | — | — | — | — |
| Santicizer 261 | — | — | — | — | 10 | — | — | — |
| Santicizer 278 | — | — | — | — | — | 10 | — | — |
| DBP | — | — | — | — | — | — | 10 | — |
| DOP | — | — | — | — | — | — | — | 10 |
| Rubinate MF 182 | 63.2 | 63.2 | 63.2 | 63.2 | 63.2 | 63.2 | 63.2 | 63.2 |
| Isocyanate index | 100 | 100 | 100 | 100 | 100 | 100 | 100 | 100 |
| Properties | | | | | | | | |
| Density (Kg/cm³) | 40.05 | 36.84 | 36.84 | 38.44 | 38.44 | 38.44 | 40.05 | 38.44 |
| Tensile strength | 41.3 | 51.7 | 51.7 | 57.9 | — | 55.1 | — | 54.4 |

TABLE 7-continued
The effect of Plasticizers (10 pbw) on the Properties of Water Blown MDI-Based Flexible Foams.

| Designation | 1 | 2 | 3 | 4 | 5 | 6 | 7 | 8 |
|---|---|---|---|---|---|---|---|---|
| (KPa) | | | | | | | | |
| Elongation (%) | 92 | 86 | 75 | 87 | — | 100 | — | 81 |
| Tear strength (Kg/cm) | 0.24 | 0.17 | 0.16 | 0.18 | 0.17 | 0.18 | 0.18 | — |
| CFD (5 × 5 × 2.5 cm) | | | | | | | | |
| 25% (KPa) | 7.92 | 4.96 | 5.92 | 6.48 | 5.44 | 6.55 | 4.82 | 4.61 |
| 50% (KPa) | 12.68 | 7.65 | 9.44 | 10.06 | 8.54 | 10.13 | 7.72 | 7.10 |
| 65% (KPa) | 19.77 | 12.20 | 15.16 | 15.85 | 13.71 | — | 11.92 | 11.50 |
| Normalized CFD (5 × 5 × 2.5 cm) | | | | | | | | |
| 25% [KPa/(Kg/cm$^3$)] | 0.20 | 0.13 | 0.16 | 0.27 | 0.14 | 0.17 | 0.12 | 0.12 |
| 50% [KPa/(Kg/cm$^3$)] | 0.32 | 0.17 | 0.25 | 0.26 | 0.22 | 0.26 | 0.19 | 0.18 |
| 65% [KPa/(Kg/cm$^3$)] | 0.62 | 0.33 | 0.41 | 0.41 | 0.36 | — | 0.34 | 0.30 |
| IFD (5 cm thickness) | | | | | | | | |
| 25% [KPa/(Kg/cm$^3$)] | 10.05 | 4.34 | 5.99 | 6.48 | 4.48 | 6.34 | 4.48 | — |
| 65% [KPa/(Kg/cm$^3$)] | 15.91 | 9.64 | 14.50 | 14.40 | 9.92 | 13.37 | 11.92 | — |
| Sag factor | 2.27 | 2.33 | 2.4 | 2.28 | 2.26 | 2.16 | 2.7 | — |
| Flammability Burning time (sec) | 580 | 218 | 192 | — | — | — | — | — |

TABLE 8
The effect of Plasticizers (20 pbw) on the Properties of Water Blown MDI-Based Flexible Foams.

| Designation | 1 | 2 | 3 | 4 | 5 | 6 | 7 | 8 |
|---|---|---|---|---|---|---|---|---|
| Formulation (pbw) | | | | | | | | |
| Pluracol 380 | 70 | 70 | 70 | 70 | 70 | 70 | 70 | 70 |
| Thanol PPG 2000 | 30 | 30 | 30 | 30 | 30 | 30 | 30 | 30 |
| Water | 3.7 | 3.7 | 3.7 | 3.7 | 3.7 | 3.7 | 3.7 | 3.7 |
| DEOA | 0.24 | 0.24 | 0.24 | 0.24 | 0.24 | 0.24 | 0.24 | 0.24 |
| Niax A-1 | 0.16 | 0.16 | 0.16 | 0.16 | 0.16 | 0.16 | 0.16 | 0.16 |
| DC-5169 | 0.80 | 0.80 | 0.80 | 0.80 | 0.80 | 0.80 | 0.80 | 0.80 |
| Dabco 33LV | 0.60 | 0.60 | 0.60 | 0.60 | 0.60 | 0.60 | 0.60 | 0.60 |
| Plasticizer | | | | | | | | |
| Santicizer 141 | — | 20 | — | — | — | — | — | — |
| Santicizer 148 | — | — | 20 | — | — | — | — | — |
| Santicizer 160 | — | — | — | 20 | — | — | — | — |
| Santicizer 261 | — | — | — | — | 20 | — | — | — |
| Santicizer 278 | — | — | — | — | — | 20 | — | — |
| DBP | — | — | — | — | — | — | 20 | — |
| DOP | — | — | — | — | — | — | — | 20 |
| Rubinate MF 182 | 63.2 | 63.2 | 63.2 | 63.2 | 63.2 | 63.2 | 63.2 | 63.2 |
| Isocyanate index | 100 | 100 | 100 | 100 | 100 | 100 | 100 | 100 |
| Properties | | | | | | | | |
| Density (Kg/cm$^3$) | 40.05 | 41.65 | 41.65 | 40.08 | 41.65 | 41.65 | 41.65 | 41.65 |
| Tensile strength (KPa) | 4.34 | 49.61 | 56.5 | — | 36.52 | 35.14 | 46.85 | 48.23 |
| Elongation (%) | 92 | 89 | 95 | — | 89.6 | 70.9 | 94 | 84.8 |
| Tear strength (Kg/cm) | 0.24 | 0.14 | 0.14 | 0.14 | 0.15 | 0.17 | 0.13 | — |
| CFD (5 × 5 × 2.5 cm) | | | | | | | | |
| 25% (KPa) | 7.92 | 6.13 | 6.51 | 4.13 | 4.13 | 6.60 | 5.79 | 4.27 |
| 50% (KPa) | 12.68 | 9.92 | 8.96 | 6.47 | 6.54 | 9.92 | 8.75 | 6.57 |
| 65% (KPa) | 19.77 | 15.30 | 14.47 | 9.44 | 10.20 | 13.92 | 14.05 | 11.71 |
| Normalized CFD (5 × 5 × 2.5 cm) | | | | | | | | |
| 25% [KPa/(Kg/cm$^3$)] | 0.20 | 0.15 | 0.13 | 0.10 | 0.10 | 0.15 | 0.14 | 0.10 |
| 50% [KPa/(Kg/cm$^3$)] | 0.32 | 0.24 | 0.22 | 0.16 | 0.15 | 0.24 | 0.21 | 0.16 |
| 65% [KPa/(Kg/cm$^3$)] | 0.62 | 0.32 | 0.35 | 0.24 | 0.24 | 0.33 | 0.34 | 0.28 |
| IFD (5 cm thickness) | | | | | | | | |
| 25% [KPa/(Kg/cm$^3$)] | 9.65 | 5.37 | 5.44 | — | 5.03 | 5.5 | — | — |
| 65% [KPa/(Kg/cm$^3$)] | 15.92 | 11.64 | 11.64 | — | 11.30 | 12.4 | — | — |
| Sag factor | 2.27 | 2.20 | 2.18 | — | 2.30 | 2.30 | — | — |
| Flammability Burning time (sec) | 580 | — | 122 | — | — | — | — | — |

The addition of the plasticizers of this invention to water blown diphenylmethane diisocyanate-based polyurethane foams produced a softer, more flexible polyurethane foam which, more importantly, displayed good load bearing properties (having a support factor higher than 2) without significant degradation of the other required strength properties.

It will be apparent from the examples that many other variations and modifications may be made in the compositions and processes described without departing from the concept of the invention. Accordingly, it should be understood that the description and examples are illustrative only and are not intended to limit the scope of the invention.

We claim:

1. A flexible plasticized polyurethane foam comprising a foamable polyurethane compound produced by the reaction of a polyol and diphenylmethane diisocyanate, an amount of a non-halogen containing foaming agent sufficient to produce a foam from said polyurethane compound and a plasticizer selected from the group consisting of phthalate plasticizers, phosphate ester plasticizers and benzoate plasticizers.

2. The flexible plasticized polyurethane foam of claim 1 wherein said non-halogen containing foaming agent is water or a non-halogen containing gas.

3. The flexible plastized polyurethane foam of claim 2 wherein said non-halogen containing foaming agent is water.

4. The flexible plasticized polyurethane foam of claim 1 wherein said plasticizer is an alkyl aryl phthalate.

5. The flexible plasticized polyurethane foam of claim 4 wherein said alkyl aryl phthalate is selected from the group consisting of butyl benzyl phthalate, alkyl benzyl phthalate wherein said alkyl group has a carbon chain having from seven to nine carbon atoms, and Texanol benzyl phthalate.

6. The flexible plasticized polyurethane foam of claim 1 wherein said plasticizer is a phosphate ester.

7. The flexible plasticized polyurethane foam of claim 6 wherein said phosphate ester is selected from the group consisting of 2-ethyl hexyl diphenyl phosphate and isodecyl diphenyl phosphate.

8. The flexible plasticized polyurethane foam of claim 1 wherein said plasticizer is a phthalate plasticizer.

9. The flexible plasticized polyurethane foam of claim 8 wherein said phthalate plasticizer is selected from the group consisting of diisononyl phthalate, diisodecyl phthalate, dioctyl phthalate, dihexyl phthalate, diheptyl phthalate, butyl octyl phthalate, linear dialkyl phthalate wherein said alkyl groups are independently carbon chains having from seven to eleven carbon atoms, and butyl cyclohexyl phthalate.

10. The flexible plasticized polyurethane foam of claim 1 wherein said plasticizer is a phosphate ester.

11. The flexible plasticized polyurethane foam of claim 10 wherein said phosphate ester is selected from the group consisting of 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate.

12. The flexible plasticized polyurethane foam of claim 1 wherein said plasticizer is a benzoate plasticizer.

13. The flexible plasticized polyurethane foam of claim 12 wherein said benzoate plasticizer is selected from the group consisting of Texanol benzoate, glycol benzoate, propylene glycol dibenzoate and dipropylene glycol dibenzoate.

14. A flexible plasticized polyurethane foam comprising a foamable polyurethane compound produced by the reaction of a polyol and diphenylmethane diisocyanate, an amount of water sufficient to produce a foam from said polyurethane compound and an alkyl aryl phthalate plasticizer selected from the group consisting of butyl benzyl phthalate, alkyl benzyl phthalate wherein said alkyl group has a carbon chain having from seven to nine carbon atoms, Texanol benzyl phthalate, diisononyl phthalate, diisodecyl phthalate, dioctyl phthalate, dihexyl phthalate, diheptyl phthalate, butyloctyl phthalate, linear dialkyl phthalate wherein said alkyl groups are independently carbon chains having from seven to eleven carbon atoms, and butyl cyclohexyl phthalate.

15. A flexible plasticized polyurethane foam comprising a foamable polyurethane compound produced by the reaction of a polyol and diphenylmethane diisocyanate, an amount of water sufficient to produce a foam from said polyurethane compound and a phosphate ester plasticizer selected from the group consisting of 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate.

* * * * *